July 30, 1968   R. C. HIGLEY   3,394,764
SOIL RIPPER
Filed Sept. 28, 1961   4 Sheets-Sheet 3
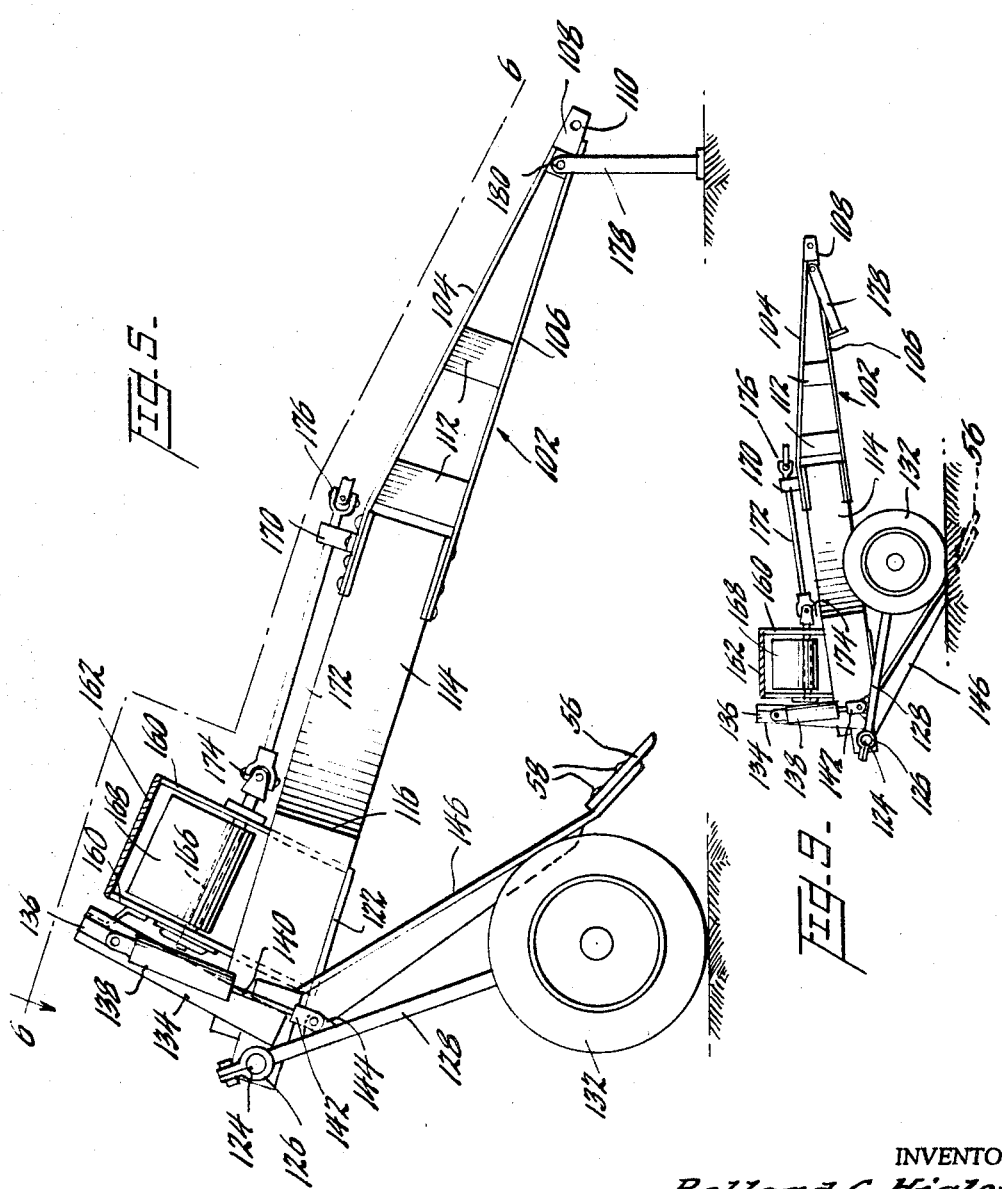
INVENTOR
Rolland C. Higley,
BY Parker and Walsh.
ATTORNEYS

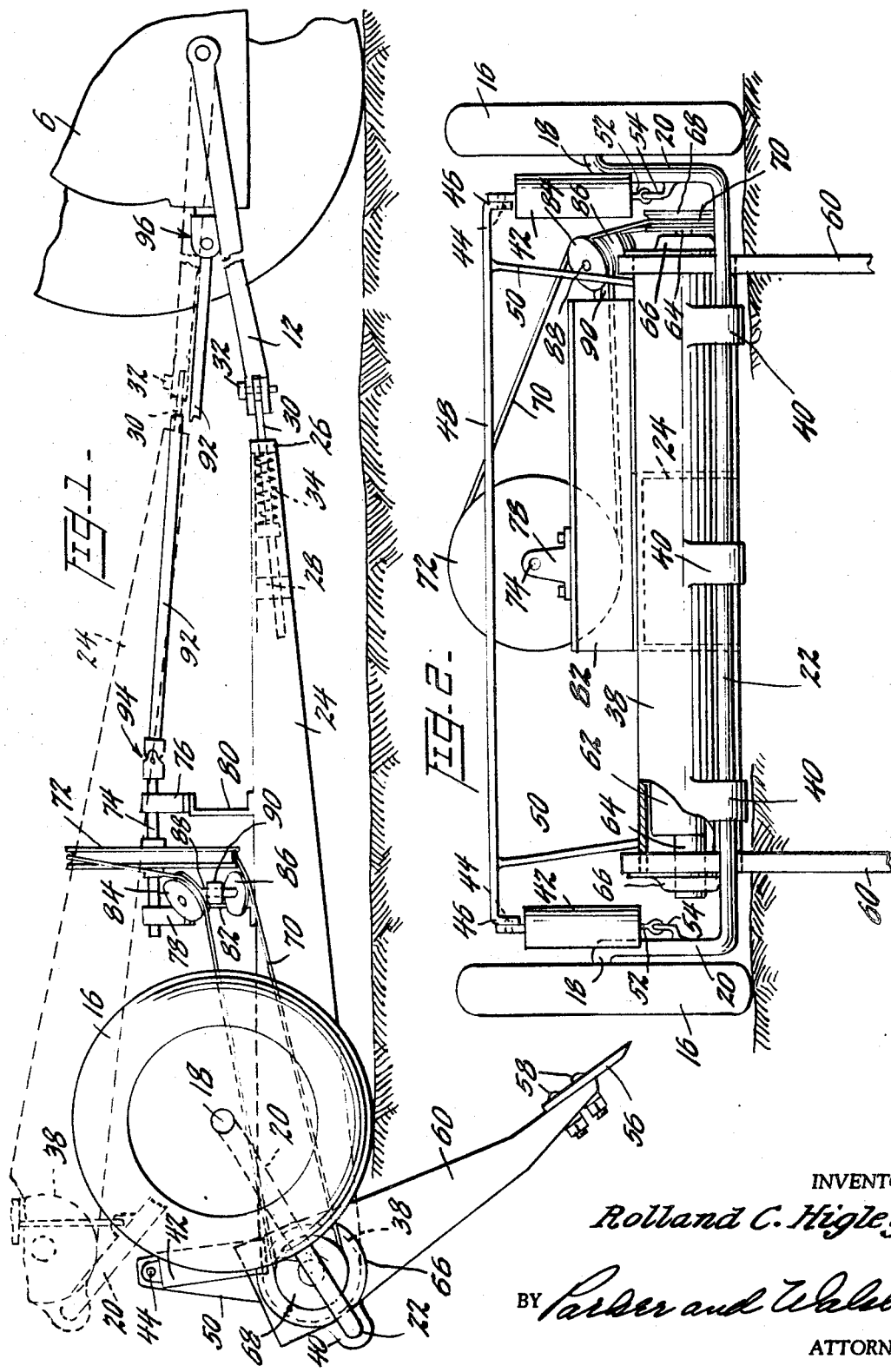

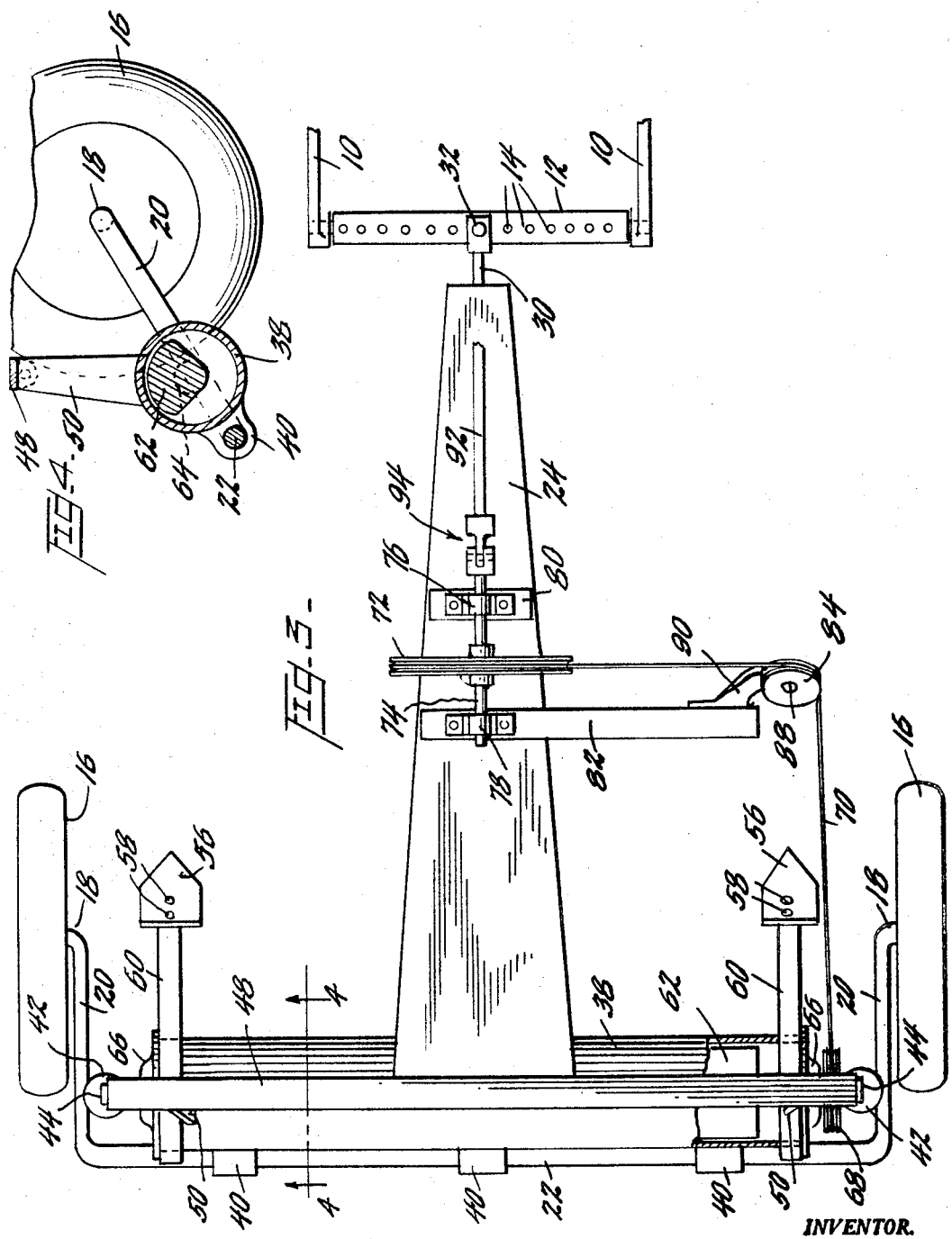

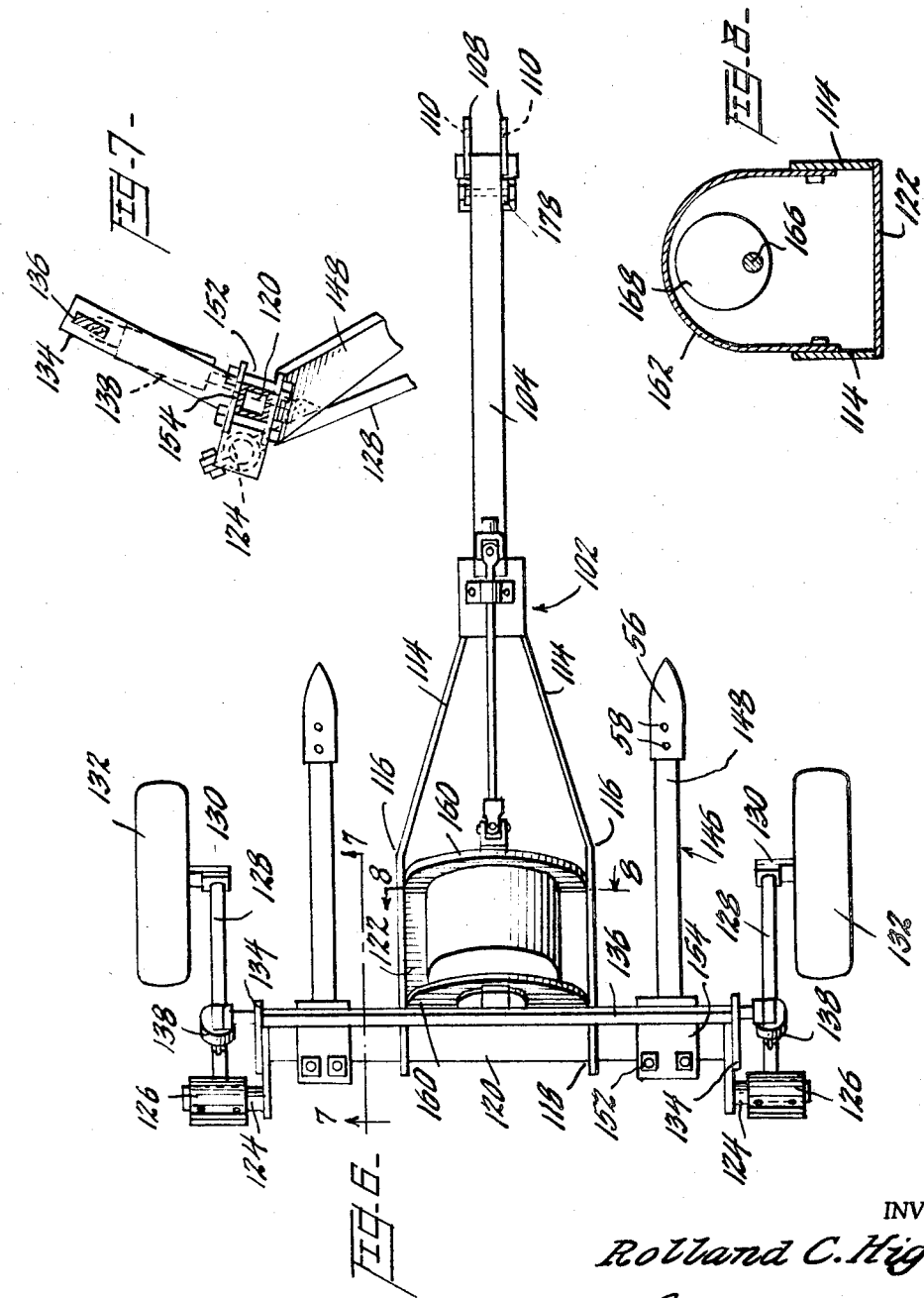

United States Patent Office 3,394,764
Patented July 30, 1968

3,394,764
SOIL RIPPER
Rolland C. Higley, 610 S. Roselawn Ave.,
Artesia, N. Mex. 88210
Continuation-in-part of application Ser. No. 2,619,
Jan. 15, 1960. This application Sept. 28, 1961, Ser.
No. 142,456
15 Claims. (Cl. 172—40)

This is a continuation-in-part of application Ser. No. 2,619 filed Jan. 15, 1960, now abandoned.

This invention relates to earth-working machines, and in particular to machines of the type with earth-cleaving tools adapted to be dragged along below the surface of the ground to break it up from its packed condition for various purposes such as aeration, weed-killing and the improvement of water-retention properties. The latter problem takes on an added prominence in the more arid regions requiring loosening of the soil to greater depths than normal. Since the power requirements increase markedly with depth of penetration of the soil the problem has been heretofore attended with practical limitations, especially in the case of small-scale operations.

It is therefore an object of the invention to provide an earth-working machine which will satisfactorily cleave and break up packed soils to depths greater than heretofore practicable, without undue increase in the power requirements. A further object is to improve the subdivision of packed soil by ground-penetrating, earth-working elements.

Briefly, the above objects are accomplished by the present invention, in an apparatus having a wheeled support including a draft appliance, and articulating a series of earth cleaving tools, with associated vibrating means, which not only serve to enhance the earth-working capabilities of the tools but also to ease their forward progress.

For a more detailed description of the invention reference is made to the accompanying drawings, showing two preferred embodiments, in which:

FIGURE 1 is a side elevational view of the machine including a portion of the towing vehicle;

FIGURE 2 is a rear elevational view, as seen from the left of FIGURE 1;

FIGURE 3 is a top plan view of FIGURE 1;

FIGURE 4 is a detail taken on the sectional line 4—4 of FIGURE 3;

FIGURE 5 is a side elevational view of another embodiment in a position of rest;

FIGURE 6 is a plan view of the embodiment of FIGURE 5;

FIGURE 7 is a detail of part of the suspension taken along the line 7—7 of FIGURE 6; and FIGURE 8 is a detail section taken along the line 8—8 of FIGURE 6; and FIGURE 9 is a sketch corresponding to FIGURE 5 showing the apparatus in operating position.

Referring to the drawings by characters of reference, there is shown, in FIGURE 1, the rear portion 6 of a towing vehicle of any suitable size and construction, articulating, on a pair of pivots, a towing bridle composed of a pair of radius rods 10 to which is suitably secured a cross bar 12 having a series of perforations 14 providing for lateral adjustment of the tow point. The earth-working appliance, which is articulated at the two points, may be viewed as consisting of three distinct main units; the main body, which is the tool-bearing unit, the supporting carriage, and the power unit for adjusting the relative positions of the tool unit and carriage.

The carriage unit is of the utmost simplicity, consisting only of a pair of wheels 16 journalled on the outwardly bent ends 18 of a U-shaped axle with radius arms 20 and a horizontal cross arm 22 upon which the main body, or tool unit is mounted and supported, in swiveled relation, as presently to be described.

The main body, or tool unit, of the appliance consists, in the main, of a long, tapering platform 24, the forward portion of which constitutes a tongue for coupling to the towing bridle. The platform 24 is of channel cross section, and carries on the underside, at its forward end, a pair of mounting blocks 26, 28 having bores slidingly receiving a tow rod 30 coupled to the tow bar 12 by a pintle 32. Between the support blocks 26 and 28, the tow rod 30 carries a shock-absorbing spring 34 compressible between the forward block 26 and a collar 36 fixed on the tow rod 30.

The tongue 24 is recessed in the side flanges at its rear end to mate with the circular periphery of a tubular housing 38 to which it is welded, resulting in a T-form structure as seen from above (FIGURE 3). Three lugs 40 extending from tube 38 have aligned bores receiving the central offset, transverse portion 22 of the U-form axle. Considering the structure thus far recited, it will be readily apparent that the rear end of the platform or tongue 24 together with its attached tube 38 may be raised or lowered, swinging about the axis of wheels 16 in an arc defined by the lengths of radius arms 20 of the axle. This adjustment is powered by a pair of hydraulic power units 42 pivoted at 44 to end lugs 46 (FIGURE 2) downwardly bent from a cross arm 48 supported on a pair of legs 50 welded to the top of tube 38 at the ends thereof. The piston rods 52 of the power units are pivotally linked in bores in a pair of lugs 54 carried by the radius arms 20 of the U-shaped axle. In the interest of clarity of illustration of the essential elements of the invention, the fluid lines and controls for the hydraulic power units have been omitted from the drawings. Upon energization of the power units the piston rods are urged outwardly and the result is a tendency to increase the angle between each leg 50 and its associated axle radius arm 20. Due to the ultimate ground reaction of this thrust vertically below the axis of the wheels 16 the legs 50 are urged upwardly carrying with them the platform 24. During this movement the wheels 16 will move slightly toward the rear because the length of radius rod 20 is less than the length of the swinging platform 24.

The ground-working tools consist of hardened metal blades 56 secured by bolts 58 to depending arms 60 having circular openings received on the tube 38 to which they are welded. It will be seen that by means of the hydraulic power units the working depth of the tools may be adjusted or they may be raised to inoperative position for transport.

The vibrating system for the tool unit is contained in the tube 38, and consists of an eccentric shaft or roller 62 running lengthwise of the tube 38 and having stub shafts 64 at its ends journalled in flange bearings 66 secured to the tool legs 60. The relation of the stub shafts 64 to the offset main body of the eccentric roller 62 is best seen in FIGURE 4, the greater part of the mass of shaft 62 occupying roughly one quarter section of the space in the cross section of the tube 38. The stub shaft on the right hand end of the roller extends sufficiently outwardly to accommodate a pulley 68 driven by a belt 70. The belt may be powered by a separate source on the appliance, but is preferably driven by a power take-off from the towing vehicle. To this end a main pulley 72 is mounted on a shaft 74 rotatable and slidable in a pair of pillow blocks 76, 78 mounted on channel sections 80, 82 welded in place transversely on the top of platform 24. For the 90° difference in axial orientation of the driver and driven pulley, a pair of idler pulleys 84, 86 are mounted in suitable orientation on the ends of a bent shaft 88 carried on an arm 90 secured to the rearward support channel 82 which extends outwardly from the platform 24 for this purpose. The power takeoff is accomplished by a shaft 92 and universal couplings 94 and 96.

In operation, with the appliance hitched to the towing vehicle, the tool-bearing platform is adjusted to the desired working position by operation of the hydraulic power units. As the towing vehicle moves forward the tool blades dig in to the ground in the usual manner. By a suitable clutching arrangement rotation is imparted to the takeoff shaft 92 with consequent rotation of pulley 72 and the eccentric roller 62. Rotation of the offset weight of this roller results in a steady vibration of the tool platform of relatively high frequency which imparts to the tool blades energy impulses of considerable magnitude. These pulses perform a work function in the earth which is much more efficient and complete than a straight drag of an otherwise inert tool. Not only does this result in a better job of breaking up the earth but it also eases the forward progress of the tools and thus reduces the power requirements on the towing vehicle by an amount greatly in excess of the additional power required in the vibratory action. The reduction in power requirement which has been observed to be as much as 70 percent, is eloquently illustrated by the observed fact that in actual operations, with the machine under heavy duty operations, a cutting off of the vibrator will immediately stall the towing vehicle.

Another embodiment of my invention is disclosed in FIGURES 5 to 9. In this embodiment an elongated tapering frame 102 has a forward tongue made up of an upper 104 and a lower 106 plate, reinforced by a pair of vertical plates 108 welded in box form. Plates 108 extend forwardly of plates 104 and 106 and have a pair of aligned holes 110, through which a pin may be passed to hitch the implement to a suitable draft appliance. The plates 104 and 106 diverge rearwardly to be joined to the main portion of frame 102. At suitable intermediate points, stiffening web elements 112 may be inserted.

The rear portion of the frame is made up of two side plates 114 bent at the lines 116 to form a rectangular main box, tapering toward the tongue portion of the frame. At the rear, they are welded at 118 to a box-shape cross member 120, while at the front, they are joined box wise, by welding, to the rearmost portion of plates 104 and 106 to form a solid frame extending from front to rear. The rear portions of side plates 114 are connected together along the underside by plate 122.

The cross member 120 extends outwardly in each direction with rearwardly offset axle portions 124 supporting bearings 126, mounted on the carriage elements 128. These carriage elements end in a pair of fixtures 130 for mounting the wheels 132, by which the implement is transported.

Inwardly of bearings 126 are mounted a pair of columns 134 each being connected together by arbor bar 136. From each projecting end of the arbor bar 136, there is pivotally suspended the body 138 of an hydraulic power unit. Upon the outer end of each unit's rod 140 is a clevis 142 connected with an eye 144 welded to the carriage element 128. It will be seen that the rear portion of frame 102 may be raised with respect to the ground by means of the hydraulic power unit 138; as the rods 140 are thrust outwardly, they cause the wheels to swing away from and to the rear of the implement. The implement may be lowered by retracting the rods 140 within the cylinders of units 138, causing the wheels to swing frontwardly and upwardly. For clarity, the source of the hydraulic fluid and its connection to the cylinders of units 138 has been omitted.

A pair of digging arms 146 are shown, each comprised of a tapering channel shank 148 having a base plate 150, at one end. By means of bolts 152 passing through the base plate and backing plate 154, the digging arm is secured to the box-like cross member 120. The location of the digging arms may be shifted or the number of digging arms changed, by reason of the bolt structure. However, it is usually most desirable to use only the two digging arms. Blades 56 are secured at the outer ends of the shanks by means of bolts 58.

A pair of plates 160 are welded between plates 114 and connected to plate 122 to form a housing for the operating mechanism of the implement. The plates 160 are tilted slightly forwardly with respect to the side frame members 114. To complete the housing, a cover 162 is conformed to the rounded upper portion of plates 160.

A pair of bearings 164 in the front and rear plates 160 support a shaft 166 carrying an eccentric weight 168 for rotation within the housing. When the digging blades 156 operate at optimum depth, it is desired that the shaft 166 should rotate along an axis substantially parallel with the line of travel. This accounts for the mounting of plates 160 with a small slant forward.

A pillow block 170 provides a bearing on the rear end of plate 104 to support shaft 172 connected to shaft 166 by universal joint 174. This is in turn connected to the power take off by another shaft and two more universal joints; only the universal joint 176 is shown.

A stand 178, pivoted at 180 to the plates 108, may be provided to support the implement in non-functional position. During operation of the implement, the stand may be held out of place against the plate 106.

The operation of this modification of the invention is essentially similar to that of the previously disclosed modification. The vibratory impulses transmitted to the digging teeth, caused by the rotation of the eccentric weight and transmitted through the frame of the implement, enable the teeth to be drawn through the soil being ripped with much less expenditure of total energy than occurs when the vibratory effort is disconnected. I have found that excellent results are obtained by rotating the eccentric weight at about 530 r.p.m.

While certain preferred embodiments have been shown and described, the invention is not limited thereto, since various modifications or equivalents will be readily apparent to those skilled in the art in the light of this disclosure, and the invention is not, therefore, to be deemed as limited except insofar as shall be inferrable from the spirit and scope of the appended claims.

I claim:

1. In an earth-working machine wherein the earth-working tool elements, in operative position, penetrate the earth continually in soil-cleaving relation, comprising a pair of wheels mounted on an axle having a central portion radially offset from the axis of the wheels, a tubular housing with exterior lugs receiving the said central portion of said axle in swiveled relation, a pair of earth-working tools fixed to the ends of said housing and extending downwardly therefrom, transversely to the length thereof, bearings carried at the ends of said housing, a shaft in said housing having stub shafts at its ends journalled in said bearings and a central portion with its center of mass offset with respect to the common axis of said stub shafts, a transverse mounting frame carried by said housing, a hydraulic power unit at each end of said frame with its ends connected, respectively, to said frame and a portion of said axle intermediate the said offset portion of said axle and the turning axis of said wheels, an elongate platform fixed to and extending forwardly of said housing and constituting a draft tongue, a driver pulley mounted on said platform for rotation on an axis transverse to the turning axis of said wheels, a driver pulley on one of said stub shafts externally of its associated bearing, a pair of idler pulleys arranged to communicate rotation from said driver pulley to said driven pulley, and a belt trained over said pulleys, said driver pulley being adapted for attachment to a power take-off device leading to a towing vehicle.

2. An earth-working machine wherein the earth-working tool elements, in operative position, penetrate the earth continually in soil-cleaving relation, comprising a pair of wheels mounted on an axle having a central portion offset from the axis of the wheels, a tubular housing with exterior lugs receiving the said central portion of said axle in swiveled relation, a pair of earth-working tools fixed to the ends of said housing and extending downwardly therefrom, transversely to the length thereof, bearings carried at the ends of said housing, a shaft in said housing having stub shafts at its ends journalled in said bearings and a central portion with its center of mass offset with respect to the common axis of said stub shafts, a transverse mounting frame carried by said housing, a hydraulic power unit at each end of said frame with its ends connected, respectively, to said frame and a portion of said axle intermediate the said offset portion of said axle and the turning axis of said wheels, an elongate platform fixed to and extending forwardly of said housing and constituting a draft tongue, and means on one of said stub shafts for communicating rotation from a power source thereto.

3. An earth-working machine wherein the earth-working tool elements, in operative position, penetrate the earth continually in soil-cleaving relation, comprising a pair of wheels mounted on an axle having a central portion offset from the axis of the wheels, a tubular housing with exterior lugs receiving the said central portion of said axle in swiveled relation, a plurality of earth-working tools fixed to said housing and extending downwardly transversely to the length thereof, bearings carried at the ends of said housing, a shaft in said housing having stub shafts at its ends journalled in said bearings and a central portion with its center of mass offset with respect to the common axis of said stub shafts, a transverse mounting frame carried by said housing, power means operating between said frame and the portions of said axle intermediate the said offset portion of said axle and the axis of said wheels whereby to effect separation of said frame from said intermediate portion of said axle, an elongate platform fixed to and extending forwardly of said housing and constituting a draft tongue, and means for communicating rotation to said shaft from a power source.

4. An earth-working machine wherein the earth-working tool elements, in operative position, penetrate the earth continually in soil-cleaving relation, comprising a pair of wheels mounted on an axle having a central portion offset from the axis of the wheels, a tubular housing with exterior lugs receiving the said central portion of said axle in swiveled relation, a plurality of earth-working tools fixed to said housing and extending downwardly transversely to the length thereof, a shaft enclosed in said housing, having stub shafts at its ends journalled in said housing, and having a central portion with its center of mass offset with respect to the common axis of said stub shafts, power means operating between said housing and the portions of said axle intermediate the said offset portion of said axle and the axis of said wheels, whereby to cause separation of said housing away from said intermediate portion of said axle, an elongate platform fixed to and extending forwardly of said housing and constituting a draft tongue, and means for communicating rotation to said shaft from a power means.

5. An earth-working machine wherein the earth-working tool elements, in operative position, penetrate the earth continually in soil-cleaving relation, comprising a pair of wheels mounted on an axle having a central portion offset from the axis of the wheels, an elongate platform constituting a draft tongue, bearing supports carried by said platform, a shaft having stub shafts at its ends journalled in said supports and having a central portion with its center of mass offset from the common axis of said stub shafts, means articulating said platform to the said offset portion of said axle with the axis of said stub shafts parallel to said offset portion of said axle, means operating between said platform and said axle to effect relative swinging movement therebetween, and earth-working tools depending from said platform in proximity to said shaft.

6. A soil-tilling machine wherein the soil-tilling tool elements, in operative position, penetrate the soil continually in soil-cleaving relation, comprising a pair of wheels mounted on an axle having a central portion offset from the axis of the wheels, a platform having depending soil-tilling tools, bearing support carried by said platform, a shaft having stub shafts at its ends journalled in said supports and having a central portion with its center of mass offset from the axis of said stub shafts, means articulating said platform to the said offset portion of said axle, and means operating between said platform and said axle to effect relative swinging movement therebetween.

7. A draft implement for deep disruption of the soil comprising an elongated box-like shaft having axles extending outwardly of its ends, a pair of elongated carriage elements each having a bearing at one end adapted to be mounted on one of said axles with its carriage element extending forwardly at right angles to said shaft, a pair of wheels one each mounted on the free ends of the carriage elements with the axis of rotation of the wheels parallel to the shaft axis, an arbor-like framework supported by the box shaft, having portions extending above the axles, a pair of hydraulic power units, one each supported at one end, on the framework and at the other end, connected to an intermediate portion of one of the carriage elements, an elongated framework fixed to and extending forwardly of said box shaft and constituting a draft tongue, a pair of transverse support members in said framework, a bearing in each support member, a second shaft supported for rotation in said bearings with its axis extending in the direction of movement of the implement and generally parallel to the ground when the implement is operative, an eccentric weight mounted for rotation on said second shaft, means for connecting said second shaft to be a power take-off element on a draft vehicle and a pair of soil disrupting elements fixed to said box shaft and extending downwardly and forwardly therefrom.

8. A draft implement for deep disruption of the soil comprising an elongated box-life shaft having axles extending outwardly of its ends, a pair of elongated carriage elements each having a bearing at one end adapted to be mounted on one of said axles with its carriage element extending forwardly at right angles to said shaft, a pair of wheels one each mounted on the free ends of the carriage elements with the axis of rotation of the wheels parallel to the shaft axis, an arbor-like framework supported by the box shaft, having portions extending above the axles, a pair of hydraulic power units, one each supported at one end, on the framework and at the other end, connected to an intermediate portion of one of the carriage elements, an elongated framework fixed to and extending forwardly of said box shaft and constituting a draft tongue, a pair of transverse support members in said framework, a bearing in each support member, a second shaft supported for rotation in said bearings with its axis extending in the direction of movement of the implement and generally parallel to the ground when the implement is operative, an eccentric weight mounted for rotation on said second shaft, means for communicating rotative movement thereto and a pair of soil disrupting elements fixed to said box shaft and extending downwardly and forwardly therefrom.

9. A draft implement for deep disruption of the soil comprising an elongated box-like shaft having axles extending outwardly of its ends, a pair of elongated carriage elements each having a bearing at one end adapted to be mounted on one of said axles with its carriage element extending forwardly at right angles to said shaft, a pair of wheels one each mounted on the free ends of the carriage elements with the axis of rotation of the wheels parallel to the shaft axis, power means operating between the box shaft, and intermediate portions of the carriage elements whereby to effect angular movement of said carriage elements relative to said box shaft, an elongated framework fixed to and extending forwardly of said box shaft and constituting a draft tongue, a pair of transverse support members in said framework, a bearing in each support member, a second shaft supported for rotation in said bearings with its axis extending in the direction of movement of the implement and generally parallel to the ground when the implement is operative, an eccentric weight mounted for rotation on said second shaft, means for connecting said second shaft to a power take-off element on a draft vehicle and a pair of soil disrupting elements fixed to said box shaft and extending downwardly and forwardly therefrom.

10. A draft implement for deep disruption of the soil comprising a platform having attached thereto depending teeth, extending deep in the earth when the implement is in operative position, a shaft journalled for rotation on said platform and supporting for rotation thereupon a mass substantially offset from the axis of rotation of the shaft, means for communicating rotative movement to said shaft, transport means for supporting the implement in its movement across the earth and means connecting the transport means and the implement, said connecting means including means for lifting the teeth out of penetration of the soil into inoperative position, the rotatable offset mass being arranged to communicate, to the soil-tilling teeth, a vibratory movement that materially reduces the draft requirement of the implement in operation.

11. The draft implement of claim 10 including means for positioning the axis of rotation of the shaft supporting the offset weight in generally parallel relationship to the ground while the implement is in operative position.

12. The draft implement of claim 11 wherein the shaft is arranged substantially parallel to the line of travel of the implement.

13. The draft implement of claim 11 wherein the shaft is arranged substantially at right angles to the line of travel of the implement.

14. A draft implement for deep disruption of the soil comprising a platform having attached thereto depending soil-tilling tool elements, extending deep in the earth when the implement is in operative position, a shaft journalled for rotation on said platform and supporting for rotation thereupon a mass substantially offset from the axis of rotation of the shaft, means for communicating rotative movement to said shaft, a pair of wheels for supporting the implement in its movement across the soil and means connecting the wheels of the implement, said connecting means including means for lifting the tool elements out of penetration of the soil into inoperative position, the rotatable offset mass being arranged to communicate, to the soil-tilling tool elements, a vibratory movement that materially reduces the draft requirement of the implement in operation.

15. A soil-tilling agricultural implement for deep disruption of the soil, comprising a tool support structure for traversing the soil to be tilled, having attached thereto for support at least one soil-tilling tool element extending deep in the soil when the implement is in operative position, said tilling tool element being suspended from and below said support structure, to be moved through the soil along a path substantially parallel to the soil surface, a shaft journalled for rotation on said support structure and carrying a mass substantially offset from the axis of rotation of said shaft, means for communicating rotative movement to said shaft so as to impart vibratory motion to said tool element, and transport means for supporting said implement acting through said tool support for traverse across the soil to be tilled.

References Cited

UNITED STATES PATENTS

| | | | |
|---|---|---|---|
| 1,969,684 | 8/1934 | Bird | 172—413 |
| 2,792,769 | 5/1957 | Harshenberger | 172—40 |
| 2,641,173 | 6/1953 | Rhoten. | |
| 2,613,582 | 10/1952 | Harshberger | 172—40 |

FOREIGN PATENTS

| | | |
|---|---|---|
| 401,265 | 1/1943 | Italy. |
| 580,703 | 8/1958 | Italy. |
| 982,655 | 1/1951 | France. |

ABRAHAM G. STONE, *Primary Examiner.*

J. R. OAKS, *Assistant Examiner.*